April 6, 1965   C. L. SEEFLUTH ET AL   3,177,106
METHOD AND MEANS FOR TACKING OF COVERS TO THERMOPLASTIC
CONTAINERS PRIOR TO SEALING
Filed April 28, 1961
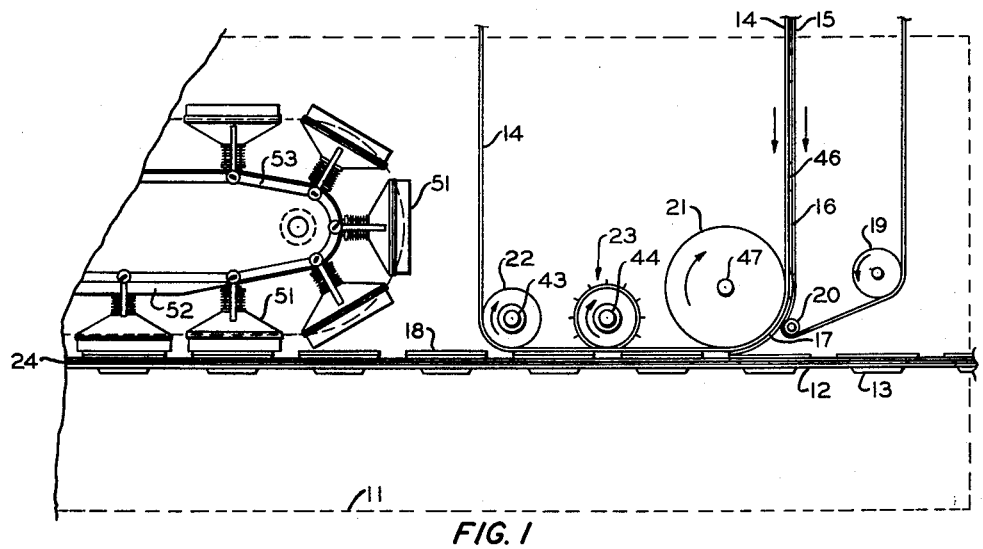
FIG. 1
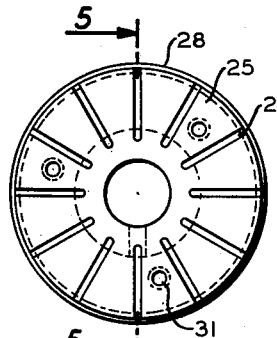
FIG. 3
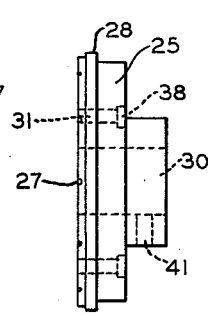
FIG. 4
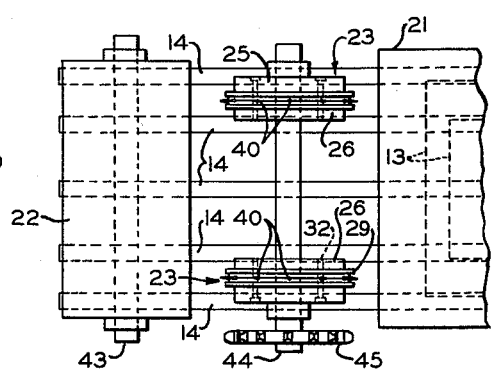
FIG. 2
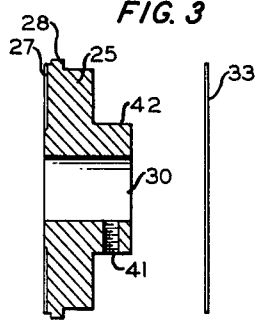
FIG. 5
FIG. 6
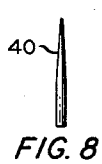
FIG. 7
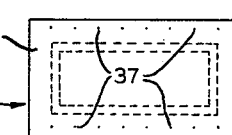
FIG. 9
FIG. 10a
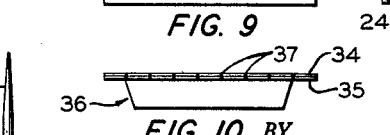
FIG. 10
FIG. 8
INVENTORS.
C. L. SEEFLUTH
L. F. HANES
E. C. BEASON, JR.
BY Hudson & Young
ATTORNEYS 3,177,106
Patented Apr. 6, 1965

3,177,106
METHOD AND MEANS FOR TACKING OF COVERS TO THERMOPLASTIC CONTAINERS PRIOR TO SEALING
Charles L. Seefluth, Lewis F. Hanes, and Elmer C. Beason, Jr., Bartlesville, Okla., assignors to Phillips Petroleum Company, a corporation of Delaware
Filed Apr. 28, 1961, Ser. No. 106,210
6 Claims. (Cl. 156—250)

This invention relates to sealing thermoplastic members. In one aspect it relates to means for retaining one thermoplastic member in sealing position adjacent another thermoplastic member while in transit from a member positioning apparatus to a sealing apparatus. In another aspect it relates to apparatus for at least temporarily attaching a thermoplastic cover to a tray to be covered while in transit from the cover feeding mechanism to a heat sealing mechanism.

Theromplastic film and sheet materials are very useful for packaging many types of commodities, one well known example being food products. One of the advantages of the use of thermoplastic materials is that heat sealing can be utilized to fabricate and seal the packages, such as bags, boxes, wrapped coatings, etc. In producing satisfactory heat seals the proper combination of pressure, temperature and time is very important to make certain that the seal is made effectively and the packaged material is not damaged.

An object of this invention is to provide apparatus and a method for sealing thermoplastic covers to thermoplastic packages. Another object of this invention is to provide apparatus and method for properly positioning the thermoplastic film covers on thermoplastic trays to be closed and retaining the covers in position for sealing. Another object of this invention is to provide apparatus and method for retaining a cover of the thermoplastic film in proper position on a thermoplastic tray to be sealed while the tray is in transit from the cover positioning apparatus to the heat sealing apparatus.

Other objects and advantages of this invention will be realized upon reading the following description which, taken with the attached drawing, forms a part of this specification.

According to our invention, there is provided a method for sealing a thermoplastic cover to a rim around the open top portion of a thermoplastic tray, the tray having a bottom, enclosing side walls and the open top portion, after positioning the cover over the open top portion of the tray and over the rim, tacking the cover to the tray rim by pressing one or more tacking spikes into the cover and into the rim thereby mechanically retaining the cover in its proper sealing position, and removing the spikes and subsequently heat sealing the cover to the rim of the tray.

Furthermore, there is provided a unitary tray filling machine having a first means for conveying open top trays, each tray having an exterior rim around its wall at approximately the level of the open top, second means to place a cover over the open top and over the rim of each tray, third means for heat sealing the covers to the rims of the respective trays, a movable spike operatively positioned intermediate said second means and said third means and in line with a section of the rim, the axis of said section of rim being parallel to the line of movement of the first means, said spike being movable into said cover and into said rim for at least temporarily mechanically attaching the cover to the tray thereby maintaining the cover in its proper tray closure position during transport of the tray and cover from the second means to the third means.

Our invention includes specifically a tacking roller having having a peripheral surface and a central opening for accommodation of a shaft, a plurality of spaced spikes positioned radially within the roller, the spikes being so positioned within the roller that the point of each spike extends beyond the peripheral surface.

In the drawing, FIGURE 1 is a schematic illustration of the thermoplastic tray sealing portion of a continuous tray filling and sealing machine illustrating the relative positioning of the cover feeding, cover attaching and cover sealing portions of the complete machine. FIGURE 2 is a plan view of the cover attaching apparatus of this invention. FIGURE 3 is an elevational view of a portion of the apparatus of FIGURE 2. FIGURE 4 is a side elevational view of the apparatus of FIGURE 3. FIGURE 5 is a sectional elevational view of the apparatus of FIGURE 3 taken on the line 5—5 of FIGURE 3. FIGURE 6 is an end view of a shim employed in the production of a portion of the apparatus illustrated in FIGURE 2. FIGURE 7 is a view of a portion of the apparatus of FIGURE 2. FIGURE 8 is a view of another portion of the apparatus of FIGURE 2. FIGURE 9 is a plan view of a covered tray showing spike punch marks retaining a cover film in position on a tray. FIGURE 10 is a side view of the covered tray of FIGURE 9. FIGURE 10a is a view, on an enlarged scale, of the end of a spike in its operative position attaching a cover to the rim of a tray.

This invention pertains to related subject matters of copending applications Serial Nos. 97,908, now U.S. Patents No. 3,131,521, and 97,788, filed March 23, 1961, and discloses an improved thermoplastic package sealing apparatus.

In the copending application, Serial No. 97,908, now U.S. Patent No. 3,131,521, there is fully disclosed a continuously operating heat sealing machine, specifically adapted for sealing thermoplastic film covers on thermoplastic film covers on thermoplastic trays, the trays having been previously filled with a commodity, such as a food product.

The thermoplastic materials adaptable to serve as package covers for sealing to package rims include such materials as polyolefins, including polyethylene, polypropylene, and related materials, alkyl substtiuted polyvinyl pyridines, and polyvinyl benzene, polystyrene and the like.

In packaging many commodities in such containers as trays, the trays themselves are made of a fairly thick and rigid thermoplastic material. The thermoplastic covers for such trays need not be thick nor made of rigid or stiff material. The covers can be made of considerably thinner sheets and thus less costly than thick sheets. For example, these trays are sometimes made of 10 mil thick thermoplastic film while the covers are of the order of 2 to 4 mils in thickness. Such thin covers, while of ample thickness for package sealing purposes, are difficult to handle. Such thin covers when loosely positioned on trays prior to heat sealing sometimes curl due to exposure of uneven temperatures. Movement of a film can also result from mechanical vibration of the sealing machine. Curling or film movement also can result from electrostatic forces.

Furthermore, by use of the present invention need for use of an endless belt for retaining the thin covers in position prior to and during heat sealing is eliminated.

In the copending application, Serial No. 97,908, now U.S. Patent No. 3,131,521, covers or lids for package covering purposes are supplied by a roll of film; a cutter is shown and a pair of feeding belts for conveying the cut film covers to the open top trays to be sealed. In FIGURE 1 of this present application, reference numerals 14 and 15 identify cut film conveying belts similar to those of said copending application. Belts 14 and 15 appear as single belts while actually they are each a plurality of belts as belts 14 are illustrated in FIGURE 2. In FIGURE 1 cut film covers 16 separated by spaces 46 are conveyed downward from the roll of film and cutting apparatus, not shown, for positioning on the top rims of trays 13.

Belts 14 are guided, as in FIGURE 1, by idler rollers 21 and 22 rotating in the direction illustrated. One or more idler rollers and one driving roller, not shown, are illustrated in FIGURE 4 of said copending application, Serial No. 97,908, now U.S. Patent No. 3,131,521. In like manner belts 15 move at the same linear speed as do belts 14 and belts 15 are guided by idler rollers 19 and 20. Similarly, one or more additional guiding and/or drive rollers, not shown, are provided for operation of belts 15.

While reference numeral 16 identifies a thermoplastic cover as being moved downward between belts 14 and belts 15, reference numeral 17 identifies a similar thermoplastic cover being positioned on the top of a tray 13 at the right-hand portion of FIGURE 1. Belts 14, a portion of the path of travel of which is defined by the position of roller 21, are so arranged that as the cover 17 is positioned on the top of tray 13 the belts 14 hold the cover 17 in place. These belts 14 hold covers 17 in place until these belts pass around idler roller 22 and leave the vicinity of the covers.

While the covers are moving from the vicinity of roller 21 to the vicinity of roller 22, they pass beneath a tacking roller 23. Actually, there are two of these tacking rollers, one for tacking the covers to one side of the tray while the other roller tacks the cover to the opposite side of the tray. The tacking spikes 40, illustrated in their entirety in FIGURE 8, are positioned between two halves 25 and 26 of the complete tacking roller as shown in FIGURE 2. These spikes are so positioned between the two adjacent surfaces of these roller members that the points of the spikes extend beyond the outer periphery of the completed roller. Such positioning of the points of these spikes is illustrated in FIGURES 1 and 2. In one instance when the overall diameter of the rollers 23 was two inches the pointed ends of these spikes extended beyond the periphery about .031 inch. Such rollers are used to seal a thermoplastic film of two mil thickness to the rim of trays which had a thickness of ten mils. In this particular case there were provided in the rollers 23 twelve of these spikes 40 so that there would be a plurality of contact points between the film and the rim of the tray so as to make certain that the cover film was held tightly against the upper surface of the tray. In FIGURE 10a is illustrated on a greatly enlarged scale, the position of a point of spike 40 at its position of deepest penetration into cover film 34 and tray rim 35.

After each successive cover film is spike attached to the upper surface of a tray, the temporarily covered trays pass out from under belts 14 in the direction of the heat sealing portion of the apparatus.

Reference numeral 18 of FIGURE 1 identifies the thermoplastic cover spiked in sealing position on the top surface of a tray in transit from the region of belts 14 to the heat sealing apparatus 51.

The remainder of the package or tray sealing apparatus is actually not a part of this invention and it is fully described in said copending application, Serial No. 97,908, now U.S. Patent No. 3,131,521. Briefly speaking, however, after the package, on which is temporarily attached cover film 18, moves to the left, as in FIGURE 1, a heat sealing unit 51 moves downward into contact with the upper surface of cover 18. During continued movement of the package with cover 18 in contact with the heat sealing unit 51, the heat from unit 51 seals permanently cover 18 to the upper rim surface of the tray. A plurality of the heat sealing units 51 is mounted on an endless chain system which moves at the same linear speed as does the endless conveyor 12. A cam 52 is mounted on the lower end of the support of the endless chain system in such a manner that as one of the heat sealing units 51 reaches the cam the heat sealing unit is pushed downward and tightly against the upper surface of a film to be sealed. The length of time of contact desired between the heat sealing unit 51 and the film is determined by the speed of travel of the heat sealing units and the length of the cam 52. When the film is properly sealed to the upper surface of the tray and the end of the cam is reached by the sealing unit, the sealing unit then rises out of contact with the upper surface of the film and the heat sealing unit then is on its return for another sealing operation.

On reference to FIGURE 10a, it is noted that the point of the spike 40 extends downward below the lower surface of the rim 35 of tray 36, and accordingly a resilient material 24 must be provided for supporting the rim 35 of the tray. Accordingly, a layer of a silicone rubber is placed on conveyor 12 at the exact location on which the rim 35 of each of the trays will rest.

The heat sealing units 51 can if desired be heated electrically, and such heat sealing units and means for heating same are fully disclosed in said copending application, Serial No. 97,908, now U.S. Patent No. 3,131,521.

However, a bus bar 53 is illustrated in FIGURE 1 as one electrode for passage of electrical current from a source, not shown, to the heat sealing unit 51. A similar bus bar is positioned directly behind bus bar 53 for completing the circuit to the heat sealing unit.

As illustrated in FIGURE 2 of the drawing, there are two of the tacking rollers 23 so positioned on shaft 44 that spikes 40 attach the edges of the cover 17 as the cover and tray passes under the rollers.

After the covers are permanently heat sealed to the trays the trays can pass to continuously operating trimmers for trimming the edges of the trays containing the punch marks 37. With the punch marks 37 thus trimmed from the two side edges, other trimmers cut off the end edges in order to provide the tray with edges of uniform widths.

Each spike wheel 23 comprises a pair of half rollers 25 and 26. Half roller 25 contains an opening 30 for accommodation of shaft 44 and this half roller is constructed with a hub 42 containing a threaded opening 41 to accommodate a set screw. The outer periphery of this half roller is provided with a flange 28 having a slightly greater diameter than the diameter of the main portion of this half roller. This half roller is then drilled to provide at least three openings 31 for accommodation for cap screws or bolts for holding the two halves of the spiked wheels together.

The other half roller 26 is quite similar to the half roller 25 with the exception that it is not provided with a hub. For making the spike retaining grooves or slots the pair of half rollers is placed with their surfaces together as illustrated in FIGURE 2 but with a shim 33 (FIGURE 6) between the two adjacent circular surfaces. This shim has a thickness of 10 mils and the two halves are then bolted together as by the use of a cap screw 39 extending through each of the openings 31. One end of each of the openings 31 is enlarged to accommodate the head of the cap screw so that when finally positioned in making up the spike wheel the heads will be countersunk within the wheel.

Thus, by inserting a 10 mil thick shim 33 between the two half sections of the wheel and rigidly fastening the two halves together, the wheel is then ready for production of the grooves 27 for accommodation of the spikes 40. In the case illustrated herein, a No. 12 drill was used to drill holes having a diameter of 0.046 inch. The drilled holes were so positioned that a cylindrical opening was made, a portion of which extended in the hub half of the wheel, another portion in the other half of the wheel, and a portion in the shim 33. Twelve such holes were drilled at spaced intervals into the periphery of the wheel. After completion of these drilled holes, the two halves of the wheel were separated from each other and the shim removed. Then it is realized that upon reassembling of the wheel halves 25 and 26 without the shim the effective diameter of the drilled openings is 10 mils less than the diameter of the drill. The No. 12 drill making holes of 0.046 inch in diameter was selected so as to be able to use conventional phonograph needles as the tacking spikes 40. These needles 40 have diameters of approximately 0.046 inch. Thus by making the effective diameters of the drilled holes in the wheel halves slightly less than the diameter of the phonograph needles, upon positioning twelve phonograph needles in the twelve drilled openings and fastening the two wheel halves together with cap screws 39 the needles are held very, very firmly in position.

For use as spikes herein, the sharp points of the phonograph needles are ground off so that the spike points may not actually perforate the tacked film.

Reference numeral 27 is intended to identify the drill slot or groove in each of the wheel halves.

The openings 31 in the hub half of the spike wheels 25 are not threaded but the openings 32 in the other half of the wheels are threaded. In this manner upon installing the cap screws 39 and rotating them until tight, the wheel halves 26 are drawn tightly against the spikes in grooves 27.

A shaft 43 is illustrated in FIGURES 1 and 2 upon which idler roller 22 is mounted while shaft 44 is illustrated for supporting the spike wheels 23. A shaft 47 is also provided for mounting idle roller 21 while as illustrated in FIGURE 1 the spiked wheels are not mechanically rotated other than by the moving trays and covers. If desired, a mechanical means can be used for making certain that the spike wheels 23 rotate at the proper speed. As illustrated in FIGURE 2, a sprocket wheel 45 is provided as a driving means for rotating the spike wheels 23.

After the packages have been sealed as herein disclosed, the side rims containing the punch marks and the end rims removed, the sealed packages are then withdraw from the apparatus for further handling which may include for example, labeling, freezing, storage, transportation, etc.

The spike wheels of this invention are positioned between rollers 21 and 22. These rollers replace the single bottom roller which guides belts 59 in FIGURE 4 of said copending application, Serial No. 97,908, now U.S. Patent No. 3,131,521. By the use of these spike wheels the belts 60 of said copending application, Serial No. 97,908, now U.S. Patent No. 3,131,521, are not essential. The remainder of the package filling and heat sealing apparatus is substantially like that of said copending application. The heat sealing units are illustrated in detail in FIGURE 3 of said application and are fully described in the specification thereof. Also, the specific operation of the sealing apparatus is fully described therein.

While certain embodiments of the invention have been described for illustrative purposes, the invention obviously is not limited thereto.

We claim:

1. A method for attaching a thermoplastic cover to an exterior rim around the open top portion of a thermoplastic tray, said tray having a bottom, enclosing side walls, and an open top portion, said rim lying in a plane generally parallel with said bottom, which comprises positioning said cover in closing position on said tray overlapping said rim; tacking said cover to a pair of opposite sides of said rim by pressing a cold tacking spike into said cover and rim at spaced intervals longitudinally thereof while resiliently supporting the underside of said rim at said intervals; and removing said spike, thereby forming a row of punch marks along said opposite rims depressing the cover into the subjacent rim.

2. The process of claim 1 including the step of subsequently heat sealing said cover to said rim.

3. A method for sealing thermoplastic tray covers to the exterior rim forming the upper edge of open-top thermoplastic trays which comprises the steps of:
    (1) continuously moving a horizontal web carrying a series of uniformly longitudinally spaced trays thereon with their open tops up successively thru
        (a) a top positioning station,
        (b) a cold tacking station, and
        (c) a hot sealing station;
    (2) placing a top on each tray in station (a) to cover same and overlap said rim;
    (3) in station (b), punching a small area of said cover into the subjacent rim at spaced intervals along opposite side rims while resiliently supporting the underside of said rim at the punching area so as to form a row of punch marks in said cover and rim along each side rim; and
    (4) in station (c) heat sealing said cover to said rim.

4. A method for sealing a thermoplastic cover to a laterally extending flat rim bordering the open top portion of a thermoplastic tray, said tray having a bottom and surrounding side walls, the rim portions extending parallel to the direction of tray travel hereinafter described being termed side rims, comprising, positioning said cover over said top portion so as to overlay said rim, mechanically tacking said cover to said side rims by moving said tray thru a tacking station; punching a small area of said cover into the subjacent side rims at successive points along the line of travel while resiliently supporting the underside of the rim at the punch area in each instance to form a row of punch marks depressing said small area of said cover into a corresponding depressed area of said rim; and, thereafter, heat sealing said cover to said rim.

5. A tray closure machine comprising, in combination, first means for conveying open top trays to be closed, each tray having an exterior rim around its wall at approximately the level of the open top, the rim portions of each tray parallel to the direction of travel of said first means being termed side rims, second means to place a separate cover over the open top and over the entire rim of each tray, third means for heat sealing the covers to the rims of the respective trays, a resilient support under said side rims, cold tacking means positioned intermediate said second and third means comprising a pair of rotatable tacking wheels each provided with a circumferential row of protruding radial spikes, said wheels being spaced apart from each other and directly over the subjacent tray side rims with their spikes extending below the level of the underside of said side rims so that each each wheel pressure-rides one of the side rims to tack said cover to said rims by applying a row of punch marks along each side rim, thereby maintaining the respective covers in proper tray closure positions during transport of each tray and cover from said second means to said third means.

6. In apparatus for heat sealing a cover to each of a series of trays in succession, the combination of:
    (a) endless belt means having an extended section movable longitudinally thru a horizontal plane, said belt having a resilient top surface adapted to support the side rims of an open-topped thermoplastic rectangular tray, its open top being bounded by a laterally extending rim;
    (b) in succession above said belt means along the line of travel:
        (1) a cover positioning station including means for placing a cover on each of said trays overlapping said rim;
        (2) a cold tacking station comprising a pair of tacking wheels provided with a circumferential row of protruding radial spikes, rotatable on a horizontal axis transverse to the line of belt travel, said axis being positioned above said belt so that said spikes extend below the level of said resilient top surface, said wheels being spaced apart on said axis so that they pressure ride opposite side rims of said tray and form a row of punch marks into said cover and said rim to tack said cover to said tray; and (3) a hot sealing station comprising heating means having a heating surface adapted to contact the covered rim of said tray and means for positioning said heating means on the covered tray so as to heat seal said cover to said rim.

References Cited by the Examiner
UNITED STATES PATENTS

| | | | |
|---|---|---|---|
| 1,364,132 | 1/21 | Miller | 156—421 |
| 2,545,243 | 3/51 | Rumsey | 229—48 |
| 2,970,414 | 2/61 | Rohdin | 53—29 |

FOREIGN PATENTS 1,171,383  10/58  France.

EARL M. BERGERT, *Primary Examiner.*